(12) United States Patent
Pan (10) Patent No.: US 8,177,420 B2
(45) Date of Patent: May 15, 2012

(54) APPARATUS AND METHODS FOR TEMPERATURE CALIBRATION AND SENSING

(75) Inventor: Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/035,805

(22) Filed: Feb. 25, 2011

(65) Prior Publication Data

US 2011/0150029 A1    Jun. 23, 2011

Related U.S. Application Data

(62) Division of application No. 12/051,737, filed on Mar. 19, 2008, now Pat. No. 7,896,545.

(51) Int. Cl.
*G01K 15/00* (2006.01)
*G01K 7/00* (2006.01)
(52) U.S. Cl. ............................................. 374/1; 374/178
(58) Field of Classification Search ................ 374/1, 178
See application file for complete search history.

(56) References Cited

U.S. PATENT DOCUMENTS

| | | | | |
|---|---|---|---|---|
| 2,993,377 A * | 7/1961 | McCaul Dauphinee et al. | | 374/172 |
| 3,077,775 A * | 2/1963 | Hoffman | | 374/167 |
| 3,485,102 A * | 12/1969 | Glick | | 374/167 |
| 3,722,283 A * | 3/1973 | Treharne et al. | | 374/170 |
| 3,890,836 A * | 6/1975 | McKenzie et al. | | 73/168 |
| 3,902,351 A * | 9/1975 | Kreps | | 374/1 |
| 4,216,675 A * | 8/1980 | Nagata et al. | | 374/172 |
| 5,171,091 A * | 12/1992 | Kruger et al. | | 374/183 |
| 5,669,713 A * | 9/1997 | Schwartz et al. | | 374/1 |
| 5,993,060 A * | 11/1999 | Sakurai | | 374/178 |
| 6,554,469 B1* | 4/2003 | Thomson et al. | | 374/178 |
| 6,612,738 B2* | 9/2003 | Beer et al. | | 374/183 |
| 6,733,174 B2* | 5/2004 | Matsumoto et al. | | 374/178 |
| 6,934,645 B2* | 8/2005 | Kim | | 702/64 |
| 7,896,545 B2 | 3/2011 | Dong | | |
| 2003/0118079 A1 | 6/2003 | Marinet et al. | | |
| 2004/0071189 A1 | 4/2004 | Tanaka | | |
| 2004/0071191 A1 | 4/2004 | Sim et al. | | |
| 2004/0208225 A1* | 10/2004 | Otsuka | | 374/172 |
| 2006/0071189 A1* | 4/2006 | Cornwell et al. | | 251/55 |
| 2006/0267668 A1* | 11/2006 | Porter | | 327/512 |
| 2007/0189355 A1* | 8/2007 | Lorenz | | 374/1 |
| 2009/0238239 A1 | 9/2009 | Pan | | |
| 2011/0006831 A1* | 1/2011 | Pan | | 327/513 |

* cited by examiner

*Primary Examiner* — Lisa Caputo
*Assistant Examiner* — Mirellys Jagan
(74) *Attorney, Agent, or Firm* — Schwegman, Lundberg & Woessner, P.A.

(57) ABSTRACT

Some embodiments include apparatus and methods having a first switch, a second switch, and a circuit coupled to the first and second switches. The first switch may be configured to switch between an on-state and an off-state based on a value of a first current flowing through a number of resistors and a diode coupled in series with the resistors. The second switch may be configured to switch between the on-state and the off-state based on a value of a second current on a circuit path. The second current is a function of a voltage at a node between two of the resistors and a resistance of the circuit path. The circuit may be configured to provide a temperature reading based on the number of times the first switch or the second switch switches between the on-state and the off-state during a time interval.

16 Claims, 5 Drawing Sheets

APPARATUS AND METHODS FOR TEMPERATURE CALIBRATION AND SENSING

PRIORITY APPLICATION

This application is a divisional of U.S. application Ser. No. 12/051,737, filed Mar. 19, 2008, now U.S. Pat. No. 7,896,545 which is incorporated herein by reference in its entirety.

BACKGROUND

Semiconductor devices, such as memory devices and processors, can often operate at different temperatures. These devices may have a temperature sensor within the device to allow them to adjust some of their operations based on temperature readings provided by the temperature sensor. Conventional temperature sensors may provide relatively accurate temperature readings within a specific temperature range. However, outside the specific temperature range, some conventional temperature sensors may provide temperature readings with reduced accuracy.

DETAILED DESCRIPTION

Figure 1:
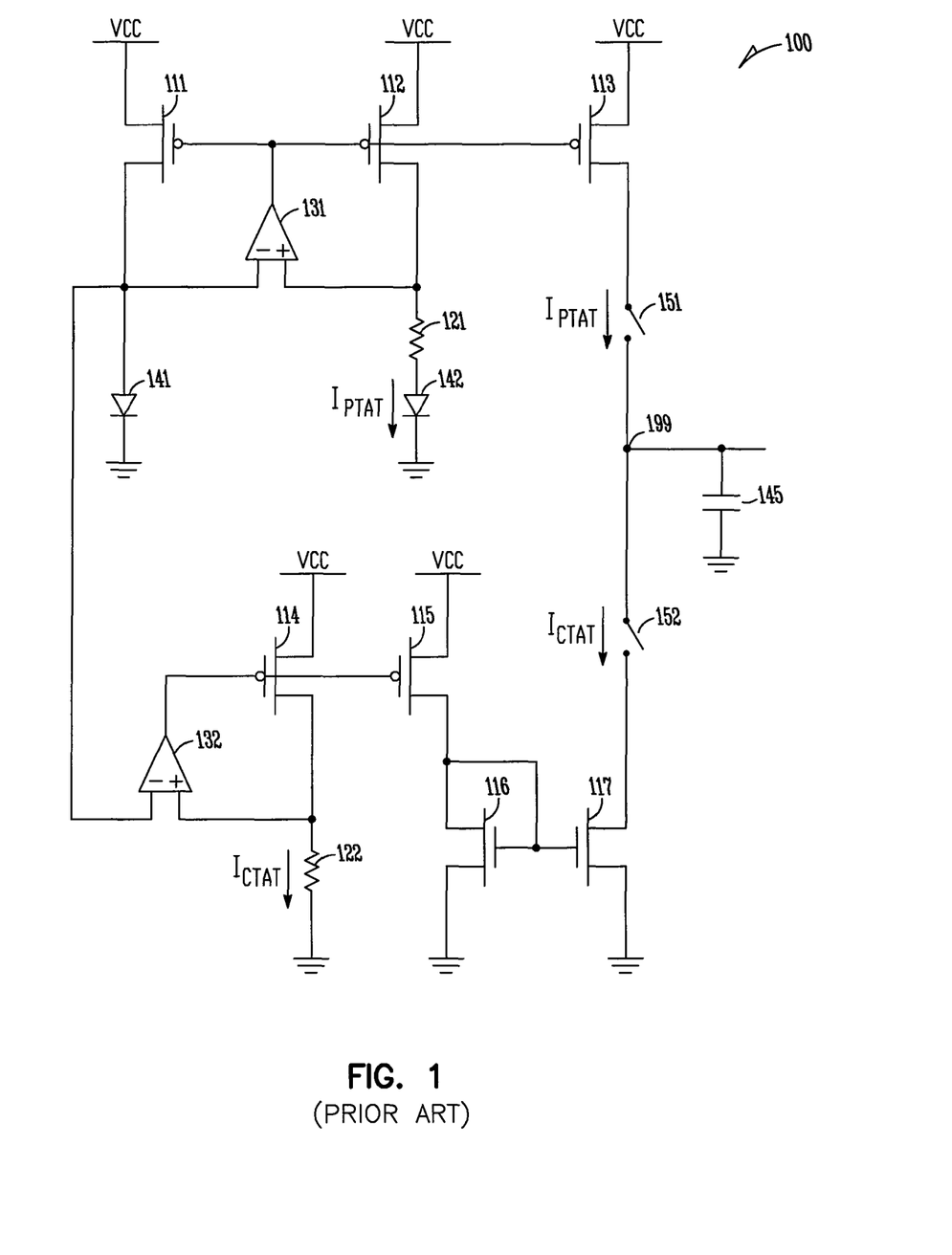
FIG. 1 shows a prior art first order delta sigma temperature sensor.

FIG. 1 shows a prior art first order delta sigma temperature sensor 100. Temperature sensor 100 includes transistors 111, 112, 113, 114, 115, 116, and 117, resistors 121 and 122, amplifiers 131 and 132, diodes 141 and 142, capacitor 145, and switches 151 and 152. Temperature sensor 100 may provide a temperature reading based on the value of a current $I_{PTAT}$ (proportional temperature absolute temperature) flowing through diode 142 and the value of a current $I_{CTAT}$ (complimentary temperature absolute temperature) flowing through resistor 122. Current $I_{PTAT}$ has a positive temperature coefficient, and increases as temperature increases. Current $I_{CTAT}$ has a negative temperature coefficient and decreases when the temperature decreases.

In operation, each of switches 151 and 152 may switch between the on-state (to allow conduction of current through the switch) and the off-state (to prevent conduction of current through the switch) based on currents $I_{PTAT}$ and $I_{CTAT}$ to allow temperature sensor 100 to provide an appropriate temperature reading. For example, when the voltage at node 199 is less than VCC/2 (one-half of supply voltage), switch 151 may switch to the on-state and switch 152 may switch to the off-state. Current $I_{PTAT}$ may flow between transistor 113 and node 199 and raise the value of the voltage at node 199. When the value of the voltage at node 199 is greater than VCC/2, switch 151 may switch to the off-state and switch 152 may switch to the on-state. Current $I_{CTAT}$ may flow between node 199 and transistor 117 and lower the value of the voltage at node 199. The switching of switches 151 and 152 may keep the voltage at the node 199 at a relatively constant value for the operation of temperature sensor 100. The current across switch 151 is equal to (100−X)% $I_{PTAT}$ and the current across switch 152 is equal to X % $I_{CTAT}$, where X is a number from 0 to 100. Since the value of the voltage at 199 is relatively constant, the average current across switch 151 may be assumed to be equal to the average current across switch 152. Thus, X % $I_{CTAT}$=(100−X)% $I_{PTAT}$. Temperature sensor 100 may use the percentage relationship between $I_{PTAT}$ and $I_{CTAT}$ in its calculation to provide the temperature reading.

Temperature sensor 100 may provide the temperature reading Temp based on equation (1) below.

$$Temp = numberofclocks\left(\frac{I_{PTAT}}{I_{PTAT}+I_{CTAT}}\right) - DCoffset \quad (1)$$

In equation (1), "Temp" represents the value of the temperature reading and has a unit in degree Celsius (° C.). "Numberofclocks" represents the number of cycles of a clock signal corresponding to specific time interval that temperature sensor 100 operates to provide each temperature reading. The number of cycles of the clocks may be fixed for temperature sensor 100. ($I_{PTAT}$/($I_{PTAT}$+$I_{CTAT}$) corresponds to (100−X)% $I_{PTAT}$, which corresponds to the number of times that switch 151 is in the on-state. "DCoffset" represents an offset value, which can be obtained during a calibration of temperature sensor 100.

For one-point calibration of a first order delta sigma temperature sensor, such as temperature sensor 100, the value of the DCoffset may be calculated as follows. During a calibration, temperature sensor 100 may be brought to a calibration temperature, which is an expected value for Temp in equation (1) at one temperature point. Then, the value of ratio $I_{PTAT}$/($I_{PTAT}$+$I_{CTAT}$) may be obtained by determining the percentage (the number of clock cycles) that switch 151 is in the on-state for a given time interval. This percentage may be obtained by counting the number of times that switch 151 switches between the on-state and the off-state. After the values of calibration temperature, numberofclocks (which is preset), and the ratio $I_{PTAT}$/($I_{PTAT}$+$I_{CTAT}$) are known, the value of DCoffset may be determined using equation (1). For example, if the calibration temperature is 90° C., the number of clock cycles is 500, and switch 151 is in the on-state for 60% of the time interval (which is 500*(60%)=300), then after substituting these values into equation (1), it becomes 90=500(60%)−DCoffset. Thus, in this example, DCoffset=300−90=210. The value 300 (which is 500*(60%)) may be obtained by counting the number of times that switch 151 switches between the on-state and the off-state. After the value of DCoffset (210 in this example) is determined, temperature sensor 100 uses this value of DCoffset, using the equation (1), for each temperature reading during a normal (non-calibration) temperature sensing operation. For example, during a temperature sensing operation, if the number of times (measured from the value of the signal at node 199) that switch 151 switches between the on-state and the off-state is 310, then the temperature reading Temp=310−210=100° C.

Equation (1) above may be rewritten as equation (2) below.

$$Temp = numberofclocks\left(\frac{n*Vt*\ln K*L}{Vd+n*Vt*\ln K*L}\right) - DCoffset \quad (2)$$

In equation (2), "n" is a process variable, having a value approximately equal to one. Vt is the thermal voltage, about 25.6 millivolts (mv) at room temp, and has a temperature coefficient about 0.085 mv/degree Celsius. The value of Vt may increase when the temperature increases. K is the ratio of the sizes of diodes 142 and 141. $I_{CTAT}$ is the current across resistor 122. L=R2/R1, where R1 is the resistive value of resistor 121 and R2 is the resistive value of resistor 122. Vd is the diode forward biasing voltage of diode 141 and has a temperature coefficient of about −1.6 mv/degree Celsius at a typical process corner. The value of Vd may vary from −1.5 mV to −1.7 mV/degree Celsius when the process varies. In equation (2), the term (Vd*n*Vt*ln K*L) may vary with temperature. Thus, the temperature readings provided by temperature sensor 100 may also vary at some temperature range.

The conventional one-point calibration technique may allow a conventional temperature sensor, such as temperature sensor 100, to provide relatively accurate temperature readings within a specific temperature range around the calibration temperature (e.g., 90° C. used in the example above) when the diode (e.g., diode 141 or diode 142 of FIG. 1) is at a typical process corner and has a temperature coefficient at a value such as −1.6 mv/degree Celsius. The conventional temperature sensor and calibration technique, however, may provide relatively reduced accurate temperature readings for a wider temperature range when process varies and the diode temperature coefficient changes from the typical −1.6 mv/degree Celsius. For example, when calibrated at a calibration temperature (e.g., 90° C.), temperature sensor 100 of FIG. 1 may provide relatively accurate temperature readings within a temperature range of 80° C. to 100° C. However, for a different temperature range (e.g., 0° C. to 125° C.), temperature sensor 100 may give some temperature readings (e.g., temperature readings between 0° C. and 80° C. and between 100° C. and 125° C.) with reduced accuracy.

Figure 2:
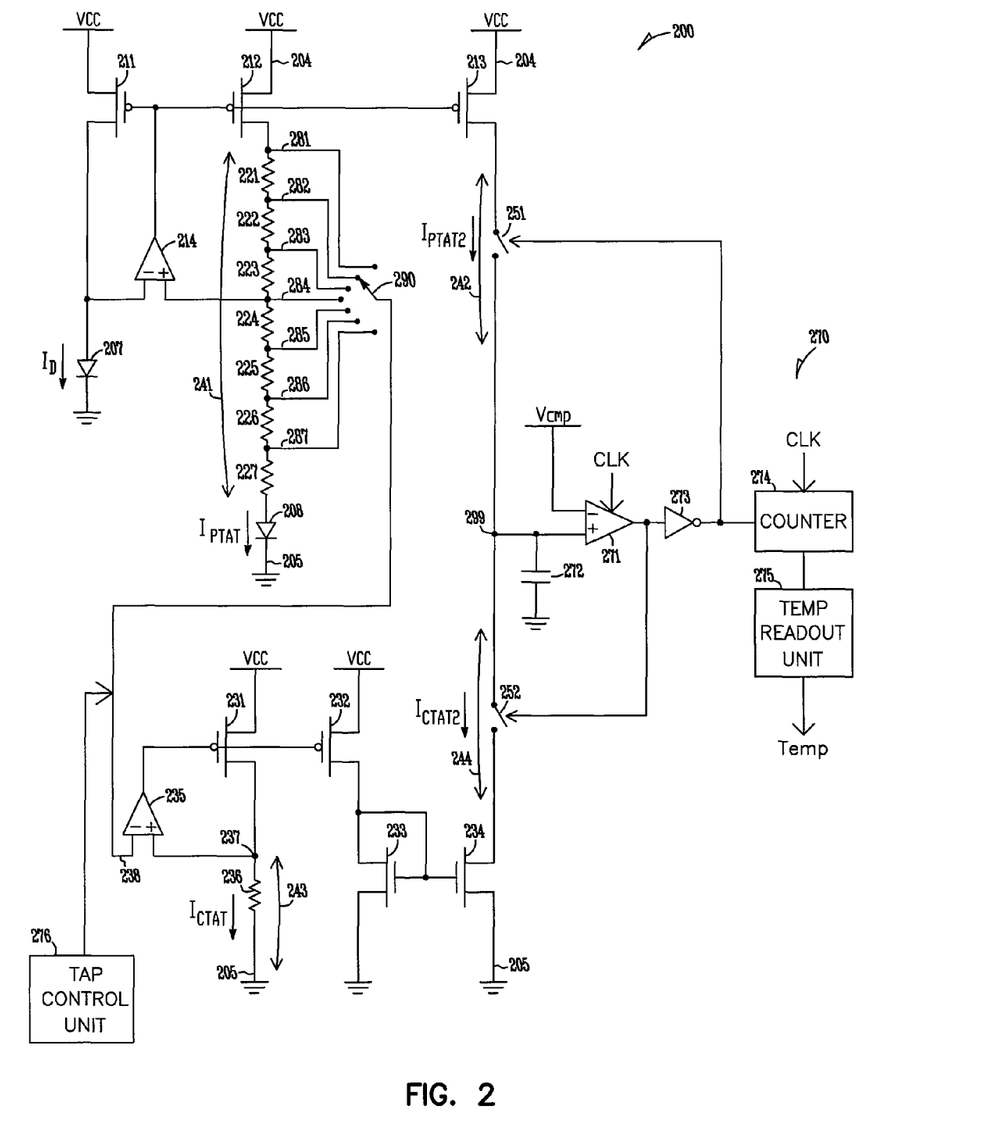
FIG. 2 shows a temperature sensor according to an embodiment of the invention.

FIG. 2 shows a temperature sensor 200 according to an embodiment of the invention. Temperature sensor 200 may provide relatively more accurate temperature readings for a relatively wider temperature range. For example, when calibrated at a temperature of 90° C., temperature sensor 200 may provide relatively more accurate temperature readings at a temperature range of 0° C. to 125° C. The calibration temperature of 90° C. and the temperature range of 0° C. to 125° C. are used as examples. Temperature sensor 200 may be calibrated at other calibration temperatures.

Temperature sensor 200 may provide temperature readings based on equation (3) below.

$$Temp = numberofclocks \left( \frac{I_{PTAT}}{(I_{PTAT} + I_{CTAT}) + (x * I_{PTAT})} \right) - DCoffset \quad (3)$$

Based on the circuit arrangement of FIG. 2, current $I_{CTAT}$ is calculated as follows. $I_{CTAT}=(Vd+I_{PTAT}*x*R1)/(L*R1)$, where R1 is a series combination of resistors 224, 225, 226, and 227, Vd is the voltage across diode 207 and equal to the voltage across resistors 224, 225, 226, and 227 and diode 208, and L=R2/R1 where R2 is resistor 236 in FIG. 2. After $I_{CTAT}=(Vd+I_{PTAT}*x*R1)/(L*R1)$ is placed in equation (3), equation (3) may be rewritten as equation (4) below.

$$Temp = numberofclocks \left( \frac{n*Vt*\ln K*L}{Vd+n*Vt*\ln K*L+(x*n*Vt*\ln K*L)} \right) - DCoffset \quad (4)$$

Equations (3) and (4) are similar to equations (1) and (2), respectively, except for an additional term (x*$I_{PTAT}$) in equation (3) or (x*n*Vt*ln K*L) in equation (4). In equation (4), if the value of "x" is appropriately selected, then Vd*n*Vt*ln K*L+(x*n*Vt*ln K*L) may become constant to allow temperature sensor 200 to provide appropriate temperature readings.

In equations (3) and (4), "x" may be called a calibration coefficient, which may be negative or positive. Calibration coefficient "x" may have a value equal to 0 at a typical diode process corner. However, as discussed above with reference to FIG. 1, the process may vary and the diode temperature coefficient may change from the typical −1.6 mv/degree Celsius. Without calibration coefficient "x", the accuracy of the temperature readings may be reduced for some temperature ranges. The addition of calibration coefficient "x" in equation (3) and (4) may allow options to adjust the components of the temperature sensor, such as temperature sensor 200, during calibration so that the temperature sensor may provide relatively more accurate temperature readings for a relatively wider temperature range after the calibration.

The value for calibration coefficient "x" may be determined by adjusting the components of temperature sensor 200, such as adjusting the connections at taps 281, 282, 283, 284, 285, 286, and 287 (FIG. 2), during a calibration to change the value of current $I_{CTAT}$ until the value of a temperature reading during the calibration matches the value of the calibration temperature. Calibration coefficient "x" may have a value of approximately −0.1 to 0.1 for a calibration temperature 90° C., for example. Adjusting the connections at taps 281 through 287 is described in more detail below. After the value of calibration coefficient "x" is determined, taps 281 through 287 may be set to a configuration to allow temperature sensor 200 to provide temperature readings based on equation (4).

As shown in FIG. 2, temperature sensor 200 may also include transistors 211, 212, and 213, amplifier 214, diode 208, and a resistors 221, 222, 223, 224, 225, 226, and 227, and a connector 290. Taps 281 through 287 may be located among resistors 221 through 227. Connector 290 may be coupled between one of taps 281 through 287 and amplifier input node 238 of an amplifier 235. FIG. 2 shows seven resistors 221 through 227 and seven taps 281 through 287 on a circuit path 241 as an example. The number of resistors and taps on circuit path 241 may vary. Resistors 221 through 227 may be coupled in series with diode 208 on circuit path 241 between supply nodes 204 and 205, which may be coupled to a supply voltage VCC and a ground potential, respectively. Diode 207 may be coupled to resistors 221 through 227 and diode 208 in a current minor circuit arrangement as shown in FIG. 2 to cause the value of current $I_{PTAT}$ to be dependent on the value of a current $I_D$ flowing through diode 207. Current $I_{PTAT}$ has a positive temperature coefficient. Transistors 211, 212, and 213, amplifier 214, diodes 207 and 208, and resistors 221 through 227 may form a current mirror to minor current $I_{PTAT}$ to a circuit path 242 as current $I_{PTAT2}$, such that current $I_{PTAT2}$ may have a value dependent on the value of current $I_{PTAT}$. For example, the value of current $I_{PTAT2}$ may be equal to the value of current $I_{PTAT}$ when transistors 211, 212, and 213 have the same size.

Temperature sensor 200 may include transistors 231, 232, 233, and 234, and a resistor 236. Resistor 236 may be coupled on a circuit path 243 between a node 237 and supply node 205 to carry current $I_{CTAT}$. Current $I_{CTAT}$ has a negative temperature coefficient. Transistors 231 through 234, amplifier 235, and resistor 236 may form a current mirror to minor current $I_{CTAT}$ to a circuit path 244 as current $I_{CTAT2}$, such that current $I_{CTAT2}$ may have a value dependent on the value of current $I_{PTAT}$. For example, the value of current $I_{CTAT2}$ may be equal to the value of current $I_{CTAT}$ when transistors 231, 223, 233, and 234 have the same size. Amplifier 235 may include an operational amplifier such that the value of the voltage at amplifier input node coupled to node 237 is equal or substantially equal to the value of the voltage at amplifier input node 238. As shown in FIG. 2, current $I_{CTAT}$ is a function of a voltage at node 237 and a resistance on circuit path 243 ($I_{CTAT}=V_{237}/R_{236}$, where $V_{237}$ is the value of the voltage at node 237, and $R_{236}$ is the resistive value of resistor 236). Since nodes 237 and 238 may have an equal or substantially equal voltage value, current $I_{CTAT}$ may also be a function of a voltage at node 238 and a resistance on circuit path 243. As shown in FIG. 2, since amplifier input node 238 may be coupled to one of taps 281 through 287, current $I_{CTAT}$ may also be a function of the voltage at a selected one of taps 281 through 287 (voltage at a node between two of resistors 221 through 227 where the selected tap is located) and a resistance of circuit path 243.

Temperature sensor 200 may include switches 251 and 252. Switch 251 may switch between the and the off-state to control a conduction of current $I_{PTAT2}$ on circuit path 242, which is coupled between node 299 and supply node 204. Switch 252 may switch between the on-state and the off-state to control a conduction of current $I_{CTAT2}$ on circuit path 244, which is coupled between node 299 and supply node 205.

Temperature sensor 200 may include a circuit 270 to provide a temperature reading Temp based on the signal at the node 299. Circuit 270 may include a comparator 271, a capacitor 272, and an inverter 273 to switch the switch 251 to the off-state and the switch 252 to the on-state when a value of the signal node 299 exceeds the value of a voltage Vcmp. Circuit 270 may switch the switch 251 to the on-state and the switch 252 to the off-state when a value of the signal node 299 is below the value of voltage Vcmp. As an example, voltage Vcmp may have a value of one-half of supply voltage VCC. Voltage Vcmp may have another voltage value.

Circuit 270 may also include a counter 274 to provide a count and a temperature readout unit 275 to provide the temperature reading Temp based on the count. Each of switches 251 and 252 may switch between the on-state and the off-state for a number of times based on the values of current $I_{PTAT2}$ and current $I_{CTAT2}$ during a time interval, which may correspond to a number of clock cycles of a clock signal such as the CLK signal. As described above, currents $I_{PTAT2}$ and $I_{CTAT2}$ may have values dependent on (e.g., equal to) the values of currents $I_{PTAT}$ and current $I_{CTAT}$, respectively. Thus, switches 251 and 252 may switch between the on-state and the off-state based on the values of currents $I_{PTAT}$ and $I_{CTAT}$.

The value of the signal at node 299 may change between different values (e.g., different voltage values) when switches 251 and 252 switch between the on-state and the off-state. Comparator 271 may be enabled one time during each cycle of the CLK signal, e.g., at the rising edge of the CLK signal. Comparator 271 may sense the change in values at node 299 to appropriately cause the signal at the output of inverter 273 to change. For example, the signal at the output of inverter 273 may have a lower voltage value when the value at node 299 exceeds the value of voltage Vcmp. In another example, the signal at the output of inverter 273 may have a higher voltage value when the value at node 299 is below the value of voltage Vcmp. Based on the value of the signal at the output of inverter 273, counter 274 may count the number of times one of the switches 251 and 252 (e.g., switch 251) switches between the on-state and the off-state during the time interval. Temperature readout unit 275 may use the count and translate it into a temperature value (value of Temp) using equation (3). For example, temperature readout unit 275 may subtract an offset value (such as the value of DCoffset in equation (3)) above from the count to provide the value of the temperature reading. The value of the offset may be obtained during a calibration of temperature sensor 200.

FIG. 2 shows amplifier input node 238 being coupled to tap 282 as an example. Amplifier input node 238 may be coupled to a different tap, depending on the result of a calibration of temperature sensor 200, as described below.

During calibration of temperature sensor 200, the value of current $I_{CTAT}$ may be changed to an appropriate value to allow temperature sensor 200 to be calibrated to a calibration temperature. As described above, current $I_{CTAT}$ is a function of the voltage at node 237 and the resistance on circuit path 243. Thus, the value of current $I_{CTAT}$ may be changed by changing the value of the voltage at node 237. Since amplifier input node coupling to node 237 is equal to, or substantially equal to, the value of the voltage at amplifier input node 238, the value of the voltage at node 237 may be changed by changing the value of the voltage at amplifier input node 238. As shown in FIG. 2, the arrangement of taps 281 through 287 among resistors 221 through 227 may allow taps 281 through 287 to have different voltage values. Thus, connecting amplifier input node 238 to a different tap during calibration of temperature sensor 200 may cause amplifier input node 238 to have a different voltage value to change the value of $I_{CTAT}$ during a calibration of temperature sensor 200.

The calibration of temperature sensor 200 may start by bringing temperature sensor 200 to a calibration temperature (e.g., 90° C.). Then, tap control unit 276 may connect amplifier input node 238 to taps 281 through 287, via connector 290, one tap at a time. For example, tap control unit 276 may connect amplifier input node 238 to tap 281 via connector 290 for a time interval, then it may disconnect amplifier input node 238 from tap 281 and connect amplifier input node 238 to tap 282 via connector 290 for another time interval. Tap control unit 276 may continue with other taps in a similar way. Tap control unit 276 may connect amplifier input node 238 to some or all of taps 281 through 287. Each time amplifier input node 238 is connected to a different tap, a temperature reading may be obtained (e.g., using circuit 270). Thus, a number of temperature readings may be obtained. The calibration may identify a selected tap among taps 281 through 287 that results in temperature sensor 200 providing a temperature reading with a value equal or closest to the value of the calibration temperature. For example, if the calibration temperature is 90° C., then the calibration may identify the tap (selected tap) that results in temperature sensor 200 providing a temperature reading with a value of 90° C. or a value closest to 90° C. FIG. 2 shows connector 290 being connected between amplifier input node 238 and tap 282 to indicate an example that tap 282 is the selected tap, which is the tap that results in temperature sensor 200 providing reading with a value equal or closest to the value of a calibration temperature during a calibration temperature sensor 200. After the selected tap is identified, the calibration may continue with setting temperature sensor 200 to a configuration such that the configuration may allow connector 290 to connect amplifier input node 238 to only the selected tap when temperature sensor 200 operates in a normal operation (e.g., the operation after the calibration).

Connector 290 may include a passive element, such as conductive line or trace, to form a conductive connection between amplifier input node 238 and the selected tap (after the selected tap is identified by the calibration). Connector 290 may also include non-passive elements such as transistors. For example, when connector 290 is a transistor, the transistor may turn on to form a conductive connection between amplifier input node 238 and the selected tap via the transistor. Control unit 276 may include features such as logic circuitry, decoder, and/or antifuse circuits to set temperature sensor 200 to a configuration to allow temperature sensor 200 to connect amplifier input node 238 to the appropriate tap (e.g., the selected tap) to provide appropriate temperature readings.

Figure 3:
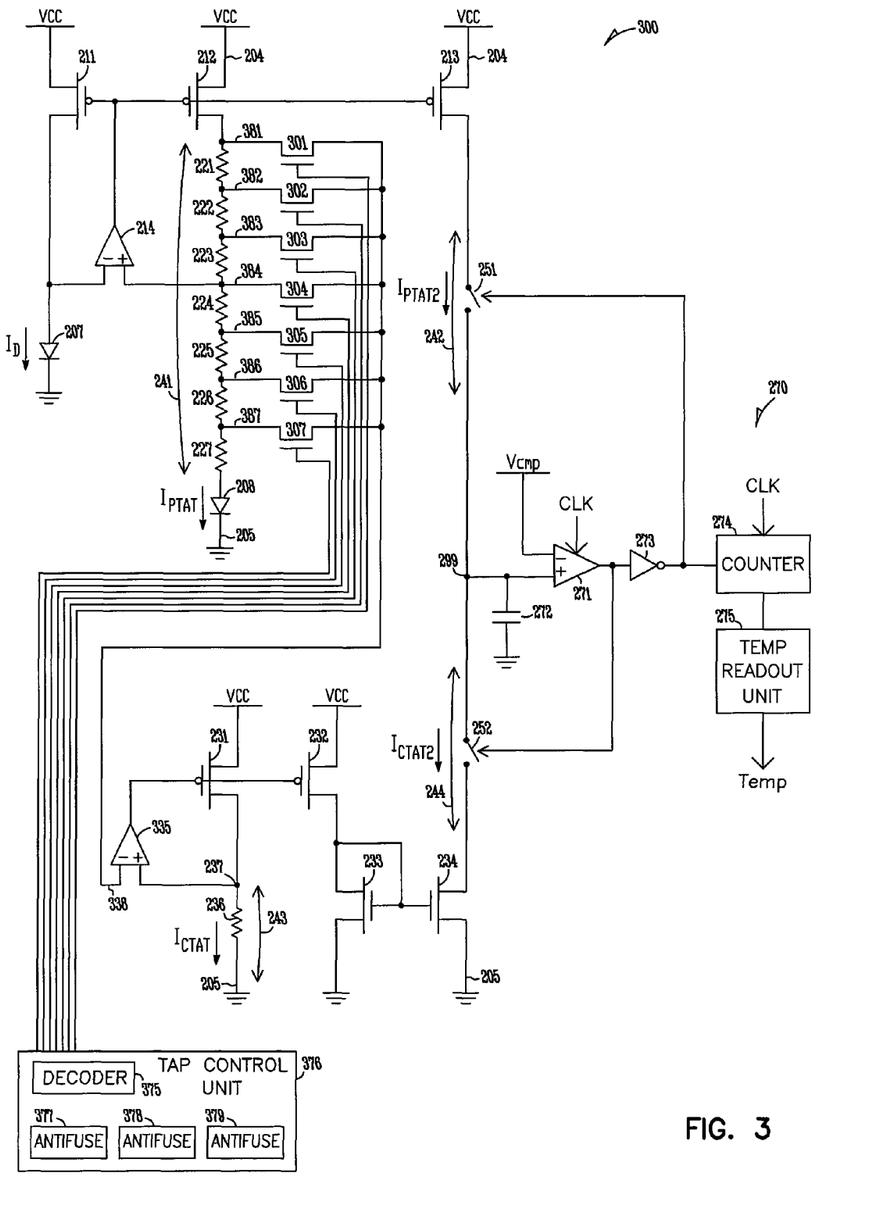
FIG. 3 shows a temperature sensor having a tap control unit according to an embodiment of the invention.

FIG. 3 shows a temperature sensor 300 having a tap control unit 376 according to an embodiment of the invention. Temperature sensor 300 may include features similar to those of temperature sensor 200 of FIG. 2, except for transistors 301, 302, 303, 304, 305, 306, and 307, and tap control unit 376 of FIG. 3. Thus, for simplicity similar features between FIG. 2 and FIG. 3 have the same reference labels.

As shown in FIG. 3, each of transistors 301 through 307 may include a terminal (e.g., source or drain) coupled to one of taps 381, 382, 383, 384, 385, 386, and 387, a terminal (e.g., source or drain) coupled to an amplifier input node 338 of amplifier 335, and a gate coupled to tap control unit 376. Temperature sensor 300 may be calibrated in ways similar to or identical to that of temperature sensor 200 of FIG. 2. For example, during a calibration of temperature sensor 300, one of taps 381 through 387 may be identified as the selected tap that results in temperature sensor 300 providing a temperature reading with a value equal or closest to the value of the calibration temperature.

Tap control unit 376 may include a decoder 375 and antifuse circuits 377, 378, and 379 to set temperature sensor 300 to a configuration to allow it to connect amplifier input node 338 to the selected tap when temperature sensor 300 operates to provide temperature readings in an operation (e.g., normal operation) after the calibration. For example, if tap 382 is identified as the selected tap during the calibration, then, during a normal operation, tap control unit 376 turns on only transistor 302 and turns off the other transistors 301 and 303 through 307, so that only transistor 302 forms a conductive connection to connect amplifier input node 338 to tap 382 while the other taps (381 and 383 through and 387) remain non-conductive.

Each of antifuse circuits 377, 378, and 379 may have an open-state to prevent a conduction of current through it, and a close-state to allow a conduction of current through it. Tap control unit 376 may use the combination of open and close states of antifuse circuits 377, 378, and 379 to control decoder 375 such that decoder 375 may activate only one of the signals at the gates of transistors 301 through 307 to turn on only the transistor that couples to the selected tap (one of taps 381 through 387). For example, antifuse circuits 377, 378, and 379 may provide eight different combinations to control up to eight different transistors, such as transistors 301 through 307. Depending on which one of taps 381 through 387 is the selected tap (during calibration), each of antifuse circuits 377, 378, and 379 may be put in the open or close state to provide an appropriate combination. For example, the state of antifuse circuit 377, 378, or 379 may be changed from the open-state to the close-state by "burning" the antifuse. Based on the states of the combination of antifuse circuits 377, 378, and 379, tap control unit 376 may turn on only one of the transistors 301 through 307 so that temperature sensor 300 may provide appropriate temperature readings.

Figure 4:
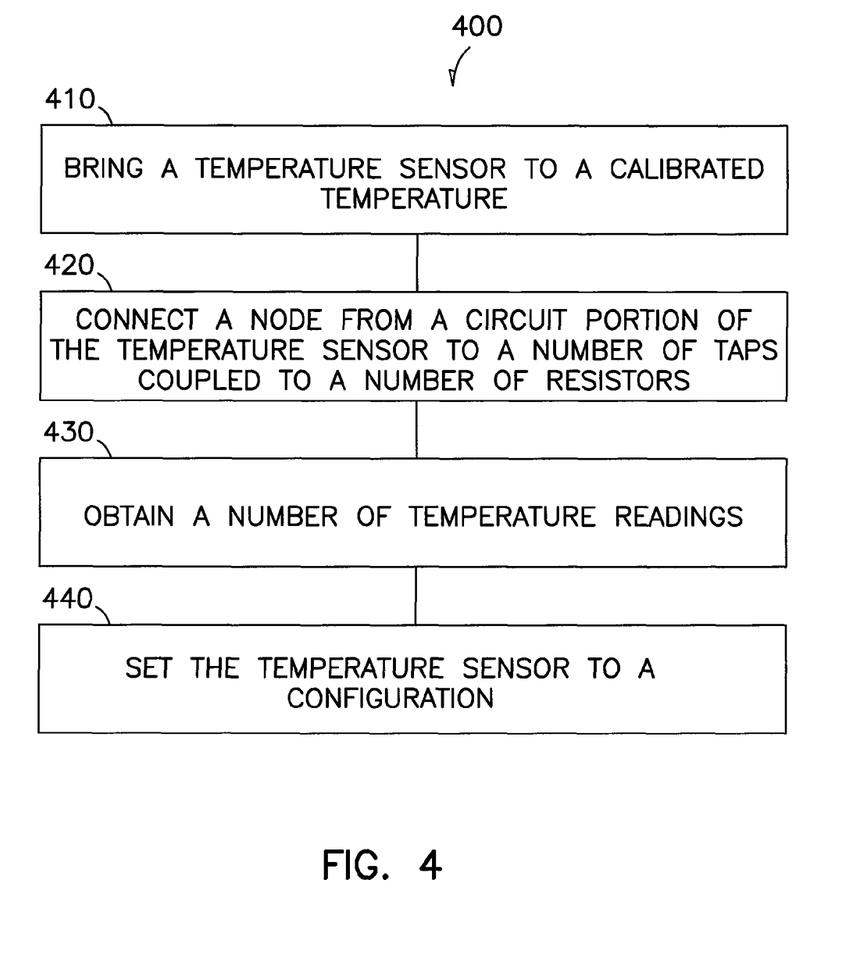
FIG. 4 is a flowchart showing methods of calibrating a temperature sensor according to an embodiment of the invention.

FIG. 4 is a flowchart showing methods 400 of calibrating a temperature sensor according to an embodiment of the invention. Methods 400 may be used to calibrate a temperature sensor such as temperature sensors 200 and 300 of FIG. 2 and FIG. 3. Thus, the components used in methods 400 may include components similar to or identical to those of temperature sensors 200 and 300 of FIG. 2 and FIG. 3. In FIG. 4, methods 400 may start at activity 410, which may include bringing the temperature sensor to a calibration temperature for the calibration. Activity 420 may include connecting a node from first circuit portion of the temperature sensor to a number of taps coupled to a number of resistors of the temperature sensor. The node may be connected to the taps one at a time. Activity 430 may include obtaining a number of temperature readings. Each of the temperature readings may be obtained when the node is connected to a different tap among the taps. Activity 440 may include setting the temperature sensor to a configuration that may allow the temperature sensor to connect the node to a selected tap when the temperature sensor operates after the calibration. The selected tap is one of the taps that results in the temperature sensor providing a temperature reading with a value equal or closest to the value of the calibration temperature during the calibration. Methods 400 may include other activities similar to or identical to the activities of temperature sensors 200 and 300 of FIG. 2 and FIG. 3.

Figure 5:
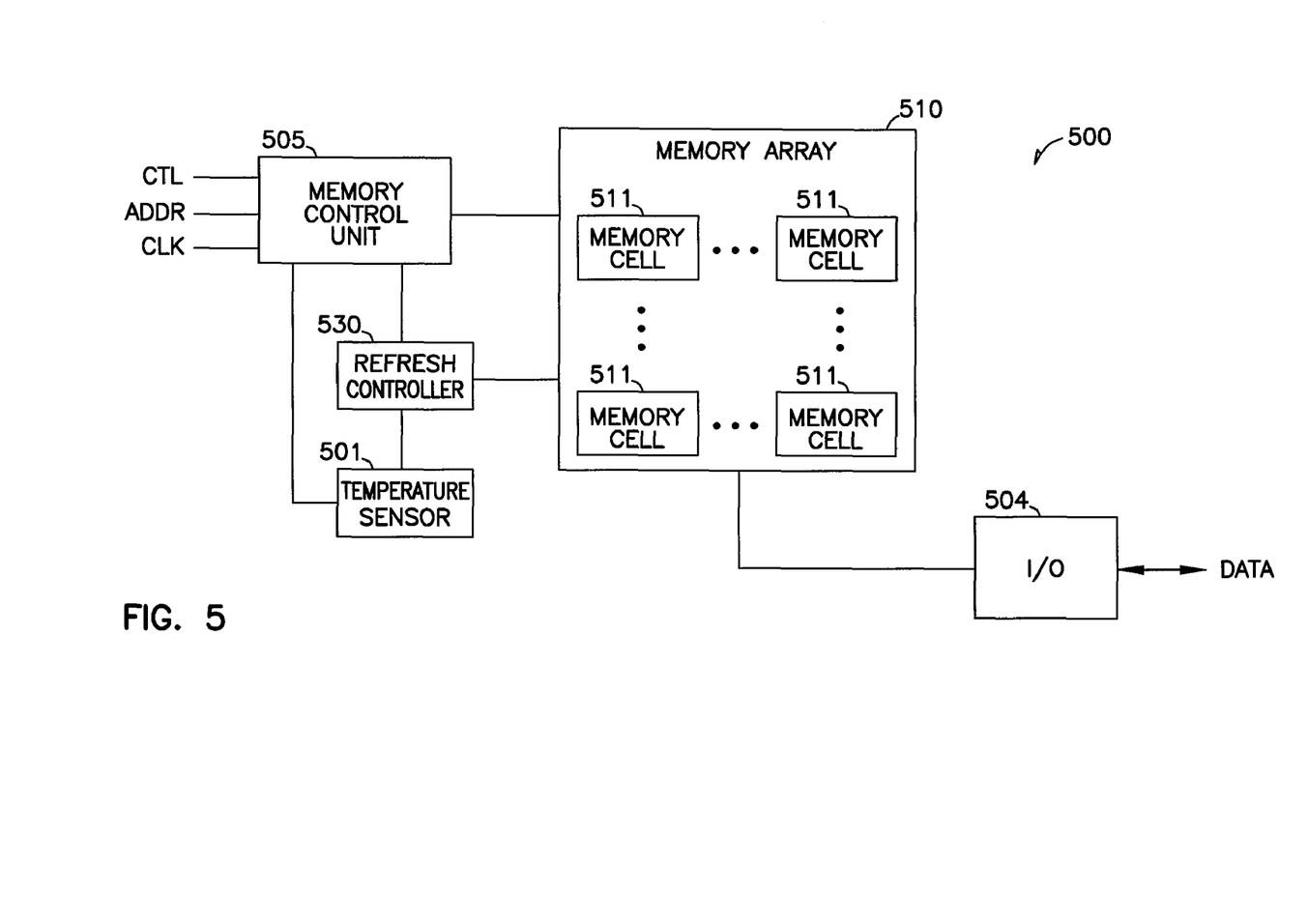
FIG. 5 shows a block diagram of a device including a temperature sensor according an embodiment of the invention.

FIG. 5 shows a block diagram of a device 500 having a temperature sensor 501 according to an embodiment of the invention. Device 500 may include a memory device such as a volatile memory device, a non-volatile memory device, or a combination of both. For example, device 500 may include a dynamic random access memory (DRAM) device, a static random access memory (SRAM) device, a flash memory device, a phase change memory device, or a combination of these memory devices. Device 500 may also include a general purpose processor, an application specific integrated circuit, or other electronic devices.

As shown in FIG. 5, device 500 may include a memory array 510 having memory cells 511 to store data and other information, and an input/output (I/O) circuit 504 to transfer data and information (represented by signals DATA) to and from device 500. Device 500 may include a memory control unit 505 to control its operations in response to signals such as control signals (CTL), address signals (ADDR), and clock signal (CLK). Operations of device 500 may include a read operation to read information from memory cells 511, a write operation to write information into memory cells 511, and a refresh operation to refresh memory cells 511. When memory cells 511 include volatile memory cells such as DRAM cells, charge representing the value of information stored in memory cells 511 may leak. The charge leakage may degrade the value of information stored in memory cells 511 or cause the information to become invalid. Device 500 may perform the refresh operation to keep the charge in memory cells 511 at an appropriate level to maintain the validity of the information stored in memory cells 511. Device 500 may refresh memory cells 511 at a refresh rate, which may depend on the temperature of device 500.

Temperature sensor 501 may sense the temperature of device 500 to provide temperature readings. Temperature sensor 501 may include temperature sensors 200 and 300 of FIG. 2 and FIG. 3. Thus, temperature sensor 501 may include a temperature sensor calibration and temperature reading operation similar to or identical to the calibration and temperature reading operation described above with reference to FIG. 2 through FIG. 4. In FIG. 5, based on the temperature readings provided by temperature sensor 501, device 500 may adjust some of its operations. For example, device 500 may adjust the refresh rate to avoid over refreshing or under refreshing of memory cells 511 when the temperature changes.

Device 500 may include a refresh controller 530 to control the refresh operation and the refresh rate based on temperature readings provided by temperature sensor 501. The amount of charge leakage from memory cells 511 is proportional to the temperature of device 500. The amount of charge leakage increases when the temperature increases and decreases when the temperature decreases. Thus, to keep the charge in memory cells 511 at an appropriate level when the temperature increases or decreases, refresh controller 530 may refresh memory cells 511 at a refresh rate that is proportional to the values of the temperature readings. For example, refresh controller 530 may refresh memory cells 511 at a higher refresh rate (refresh more often) when the temperature increases and at a lower refresh rate when the temperature decreases.

One skilled in the art may recognize that device 500 may include other features that are not shown in FIG. 5 to help focus on the embodiments described herein.

The illustrations of the apparatus, such as temperature sensors 200, 300, and 501 and device 500 described above with reference to FIG. 2 through FIG. 5, are intended to provide a general understanding of the structure of various embodiments, and not a complete description of all the elements and features of an apparatus that might make use of the structures described herein.

Any of the features described above can be implemented in a number of ways, including simulation via software. Thus, apparatus (e.g., temperature sensors 200, 300, and 501 and device 500) described above may all be characterized as "modules" (or "module") herein. Such modules may include hardware circuitry, single and/or multi-processor circuits, memory circuits, software program modules and objects and/or firmware, and combinations thereof, as desired by the architect of the apparatus (e.g., temperature sensors 200, 300, and 501 and device 500), and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to operate or simulate the operation of various potential embodiments.

The apparatus (e.g., temperature sensors 200, 300, and 501 and device 500) of various embodiments may include or be included in electronic circuitry used in high-speed computers, communication and signal processing circuitry, single or multi-processor modules, single or multiple embedded processors, multi-core processors, data switches, and application-specific modules including multilayer, multi-chip modules. Such apparatus may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

One or more embodiments described herein include apparatus and methods having a first switch, a second switch, and a circuit coupled to the first and second switches. The first switch may be configured to switch between an on-state and an off-state based on a value of a first current flowing through a number of resistors and a diode coupled in series with the resistors. The second switch may be configured to switch between the on-state and the off-state based on a value of a second current on a circuit path. The second current is a function of a voltage at a node between two of the resistors and a resistance of the circuit path. The circuit may be configured to provide a temperature reading based on the number of times the first switch or the second switch switches between the on-state and the off-state during a time interval. Other embodiments, including additional apparatus and methods are described above with reference to FIG. 2 through FIG. 5.

The above description and the drawings illustrate some embodiments of the invention to enable those skilled in the art to practice the embodiments of the invention. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is checked by the appended claims, along with the full range of equivalents to which such claims are entitled.

The Abstract is provided to comply with 37 C.F.R. §1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. A method comprising:
    connecting a connector to a tap among a plurality of taps of a temperature sensor of a device;
    obtaining a temperature reading from the temperature sensor disconnecting the connector from the tap;
    connecting the connector to an additional tap among the plurality of taps;
    obtaining an additional temperature reading from the temperature sensor; and
    determining which of the temperature reading and the additional temperature reading is closest to a calibration temperature of the temperature sensor.

2. The method of claim 1, further comprising:
    disconnecting the connector from the additional tap;
    connecting the connector to another tap among the plurality of taps; and
    obtaining another temperature reading from the temperature sensor.

3. The method of claim 1, further comprising:
    setting a connection between a node and a selected tap among the plurality of taps, wherein the selected tap is associated with one of the temperature reading and the additional temperature reading that is closest to the calibration temperature.

4. The method of claim 3, wherein setting includes configuring a transistor coupled between the node and the selected tap such that the transistor turns on during an operational mode of the temperature sensor.

5. A method comprising:
    connecting a connector to a tap among a plurality of taps of a temperature sensor of a device;
    obtaining a temperature reading from the temperature sensor disconnecting the connector from the tap;
    connecting the connector to an additional tap among the plurality of taps;
    obtaining an additional temperature reading from the temperature sensor;
    disconnecting the connector from the additional tap;
    connecting the connector to another tap among the plurality of taps;

obtaining another temperature reading from the temperature sensor; and identifying which of the tap, the additional tap, and the another tap is associated with a selected temperature reading, wherein the selected temperature is one of the temperature, the additional temperature, and the another temperature that is closest to a calibration temperature of the temperature sensor.

6. A method comprising:

selecting a tap from among a plurality of taps of a temperature sensor of a device; and setting a connection between a node in the temperature sensor and the tap, wherein the tap is associated with a temperature reading obtained during a calibration of the temperature sensor, wherein the calibration includes:
adjusting a connection between the node and the plurality of taps; and
obtaining a plurality of temperature readings, each of the temperature readings is associated with the node connecting to a different tap among the plurality of taps, wherein the temperature reading associated with the tap is included in the plurality of temperature readings, and the temperature reading associated with the tap is closer to a calibration temperature than at least one temperature reading among the plurality of temperature readings.

7. The method of claim 6, further comprising:

bringing the temperature sensor to the calibration temperature before adjusting the connection between the node and the plurality of taps.

8. The method of claim 6, wherein adjusting the connection includes connecting the node to the plurality of taps one at a time.

9. A method comprising:

selecting a tap from among a plurality of taps of a temperature sensor of a device; and setting a connection between a node in the temperature sensor and the tap, wherein the tap is associated with a temperature reading obtained during a calibration of the temperature sensor, wherein setting the connection includes configuring a transistor coupled between the node and the tap selected from among a plurality of taps such that the transistor turns on during an operational mode of the temperature sensor.

10. The method of claim 9, further comprising:

configuring an additional transistor coupled between the node and an additional tap among the plurality of taps such that the additional transistor turns off during the operational mode of the temperature sensor.

11. A method comprising:

selecting a tap from among a plurality of taps of a temperature sensor of a device; and setting a connection between a node in the temperature sensor and the tap, wherein the tap is associated with a temperature reading obtained during a calibration of the temperature sensor, wherein setting the connection includes changing a state of at least one antifuse to set the connection.

12. A method comprising:

bringing a temperature sensor to a calibration temperature during a calibration;

connecting a node from a circuit portion of the temperature sensor to a plurality of taps coupled to a plurality of resistors of the temperature sensor, wherein the node is connected to the plurality of taps one at a time;

obtaining a plurality of temperature readings, wherein each of the temperature readings is obtained when the node is connected to a different tap of the plurality of taps; and setting the temperature sensor to allow the temperature sensor to connect the node to a selected tap among the plurality of taps when the temperature sensor operates after the calibration, the selected tap being one of the plurality of taps resulting in the temperature sensor providing a temperature reading with a value closest to the value of the calibration temperature during the calibration.

13. The method of claim 12, wherein the node provides a voltage to an additional node of a circuit path, the circuit path having a current with a negative temperature coefficient, and wherein the plurality of resistors are coupled on a circuit path having a current with a positive temperature coefficient.

14. The method of claim 12, wherein setting the temperature sensor includes changing a state of at least one antifuse to provide a connection between the node and the selected tap.

15. The method of claim 12, wherein setting the temperature sensor includes configuring a transistor coupled between the node and the selected tap selected such that the transistor turns on during an operational mode of the temperature sensor.

16. The method of claim 15, wherein setting the temperature sensor includes configuring an additional transistor coupled between the node and an additional tap among the plurality of taps such that the additional transistor turns off during the operational mode of the temperature sensor.

* * * * *